United States Patent
Takasaki

(10) Patent No.: US 7,496,369 B2
(45) Date of Patent: Feb. 24, 2009

(54) IMAGING APPARATUS

(75) Inventor: Atsushi Takasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 10/207,216

(22) Filed: Jul. 30, 2002

(65) Prior Publication Data

US 2003/0027603 A1 Feb. 6, 2003

(30) Foreign Application Priority Data

Aug. 1, 2001 (JP) ............................. 2001-233471

(51) Int. Cl.
H04M 1/00 (2006.01)

(52) U.S. Cl. .............. 455/456.2; 455/420; 455/41.2; 455/556.1

(58) Field of Classification Search ............... 455/566, 455/557, 556, 456.1, 556.1, 556.2, 425, 41.2, 455/41.3, 11.1, 3.03, 517, 522, 67.1, 63, 455/456.2, 420, 3.06, 515, 514, 432.2, 432.3, 455/552.1; 348/231.6, 373, 552; 710/33; 709/217, 203; 370/328, 201.1

See application file for complete search history.

(56) References Cited

U.S. PATENT DOCUMENTS

| | | | | |
|---|---|---|---|---|
| 5,296,884 A | | 3/1994 | Honda et al. ................ 354/106 |
| 5,754,227 A | * | 5/1998 | Fukuoka ................... 348/231.6 |
| 5,943,603 A | * | 8/1999 | Parulski et al. ............. 725/133 |
| 6,269,421 B1 | | 7/2001 | Nishimura ................. 711/103 |
| 6,288,800 B1 | | 9/2001 | Izumi ........................ 358/468 |
| 6,441,854 B2 | * | 8/2002 | Fellegara et al. ....... 348/333.13 |
| 6,522,352 B1 | * | 2/2003 | Strandwitz et al. ....... 348/211.2 |
| 6,593,938 B1 | * | 7/2003 | Sakata et al. ................ 345/629 |
| 6,708,329 B1 | * | 3/2004 | Whitehill et al. ............ 717/136 |
| 6,900,912 B1 | * | 5/2005 | Miyake ....................... 358/474 |
| 6,961,540 B1 | * | 11/2005 | Kondoh ..................... 455/41.2 |
| 6,968,365 B2 | * | 11/2005 | Hollstrom et al. ........... 709/217 |
| 6,977,680 B1 | * | 12/2005 | Ichihara ................. 348/231.99 |
| 2001/0012060 A1 | * | 8/2001 | Wakui ........................ 348/211 |
| 2001/0015762 A1 | * | 8/2001 | Suzuki et al. .......... 348/333.05 |
| 2001/0051530 A1 | * | 12/2001 | Shiotsu et al. .............. 455/522 |
| 2002/0032027 A1 | * | 3/2002 | Kirani et al. ................ 455/426 |
| 2002/0187774 A1 | * | 12/2002 | Ritter et al. ................. 455/414 |
| 2003/0007189 A1 | * | 1/2003 | Kusaka et al. .............. 358/402 |
| 2003/0060218 A1 | * | 3/2003 | Billerbeck et al. .......... 455/501 |
| 2004/0017482 A1 | * | 1/2004 | Weitman ............... 348/207.99 |
| 2004/0097227 A1 | * | 5/2004 | Siegel ........................ 455/431 |
| 2007/0010244 A1 | * | 1/2007 | Tanaka et al. ............... 455/425 |

FOREIGN PATENT DOCUMENTS

| | | |
|---|---|---|
| EP | 0 833 494 A2 | 4/1998 |
| EP | 0 920 179 A2 * | 2/1999 |
| EP | 0 920 179 A2 | 6/1999 |

(Continued)

*Primary Examiner*—Tan Trinh
(74) *Attorney, Agent, or Firm*—Fitzpatrick, Cella, Harper & Scinto

(57) ABSTRACT

An imaging apparatus is wirelessly connected to a cellular phone, and additional information of image data is inputted on the cellular phone. When establishing the input, a file name is transmitted to the imaging apparatus from the cellular phone, and a file name of the image data stored on the imaging apparatus is rewritten. The imaging apparatus transmits the cellular phone a program for inputting the file name.

6 Claims, 15 Drawing Sheets

FOREIGN PATENT DOCUMENTS

| | | |
|---|---|---|
| JP | 06-225194 A | 8/1994 |
| JP | 09-312791 A | 12/1997 |
| JP | 10-173827 A | 6/1998 |
| JP | 10-224591 | 8/1998 |
| JP | 2000-287110 A | 10/2000 |

* cited by examiner

IMAGING APPARATUS

BACKGROUND OF THE INVENTION

1. Field of the Invention

The present invention relates to a wireless function preinstalled imaging apparatus capable of transferring image data of a photographed image to other device by utilizing a wireless communication function.

2. Related Background Art

In the imaging apparatus such as a digital camera, a digital video etc, the image data of the photographed image can be transferred to other digital device from the imaging apparatus body.

Each of these digital imaging apparatuses is generally provided with an interface for inputting and outputting data, and is connected by a cable to a PC (personal computer) through a general-purpose I/O port of RS232C (RS-232 Cable), USB (Universal Serial Bus) etc. Further, an image data recording medium involves the use of a general-purpose detachable memory card, and the data are transferred other digital devices such as PC etc through this memory card in many cases.

On the other hand, there can be seen also in the communication field a scheme of digitizing the general subscriber telephones with a spread of ISDN (Integrated Services Digital Network), a scheme of changing over the cellular phones to a digital system from an analog system and further a development of a new public wireless system suited to the digital data communications.

Moreover, owing to a development of a high-speed digital wireless system such as Bluetooth, wireless LAN etc for short-range local area communications, wireless direct communications in addition to the communications through the general-purpose medium such as the memory card, come to be utilized for transferring and receiving the data between the digital devices.

Under such circumstances, a wireless communication function is installed also into a portable digital imaging apparatus, and it is considered that the image data of the image photographed by the device are wirelessly transmitted by establishing connections to a cellular phone, a wireless LAN unit etc.

FIG. 2 is a functional block diagram showing an architecture of a conventional wireless function preinstalled imaging apparatus 200.

An optical image inputted from an image input unit 202 constructed of an optical element such as a lens, is converted from optical data into electronic data by an image processing unit 203 and, after undergoing a compression process etc, stored on a data recording unit 204.

An image display unit 205 displays the inputted optical image as it remains electronically converted when in a photographing process, and displays the stored image data when in a reproducing process. Further, pieces of information such as a present date/time, photographing conditions etc and a state of a wireless communication unit 201 other than the image information, are displayed on the display unit 205 under the control of a control unit 206.

A key input unit 207 is an interface used for a user to operate the imaging apparatus, and the control unit 206 processes the information thereof, thereby executing necessary operations.

In the case of using the wireless function, the control unit 206 controls the wireless communication unit 201 and the data recording unit 204 in accordance with a command given through the key input unit 207, and transmits the image data within the data recording unit 204 via the wireless communication unit 201 or saves on the data recording unit 204 the image data received through the wireless communication unit 201.

FIG. 3 is a view illustrating an operation surface of the conventional imaging apparatus.

The numeral 301 represents an imaging apparatus body corresponding to an imaging apparatus 200 in FIG. 2, wherein a photograph composition is decided, a saved data are confirmed, and so forth on a display unit 302. The display unit 302 corresponds to an image display unit 205 in FIG. 2. The numeral 303 designates a shutter button functioning as one of a variety of setting buttons when in the reproducing process. The numerals 304, 304 indicate right and left cursor buttons, the numerals 305 through 308 denote push switches used for, in combination with the shutter button 303, setting a photograph mode when photographing, selecting an image when reproducing and setting a play mode. The components 303 through 308 correspond to a key input unit 207 in FIG. 2.

Under a condition wherein a transfer and a receipt of the data are accelerated with the imaging apparatus functioning as a central device, the data transferring/receiving operations involve a large increase in key operations such as selecting the data, specifying transferring/receiving terminals, or rewriting and adding, as the necessity arises, additional information such as a file name, a photographing time and location etc. As shown in FIG. 3, however, the majority of imaging apparatus bodies are equipped with only simple input means such as direction keys and some decision keys.

This configuration is schemed from a necessity of simplifying the functions other than the imaging function to the greatest possible degree though the body, it is desirable, be small both in size and weight in terms of considering a situation that the imaging apparatus is used mainly outdoors.

Accordingly, a problem is that ten keys or a key device requiring more multiple inputs unsuited to its portability than the ten keys can not be prepared also under such a condition that the input operations frequently occur.

SUMMARY OF THE INVENTION

It is a primary object of the present invention, which is devised in view of the problems described above, to provide a high-level input means only by adding a simple configuration to an imaging apparatus body for an operation of rewriting additional information of image data internally saved in the imaging apparatus kept in connection to other device through a wireless communication function.

It is another object of the present invention to enable the additional information to be simply rewritten without providing the body with the high-level input interface.

It is a further object of the present invention to actualize a higher-level data management function without providing the imaging apparatus body with the high-level input interface by transmitting program data for actualizing rewriting the additional information on the other device wirelessly connected when rewriting the additional information of the image data internally saved by the other device wirelessly connected.

BRIEF DESCRIPTION OF THE DRAWINGS

Other objects and features of the present invention will become apparent from the description of the following embodiments taken in conjunction with the accompanying drawings, in which.

DETAILED DESCRIPTION OF THE PREFERRED EMBODIMENTS

Figure 1:
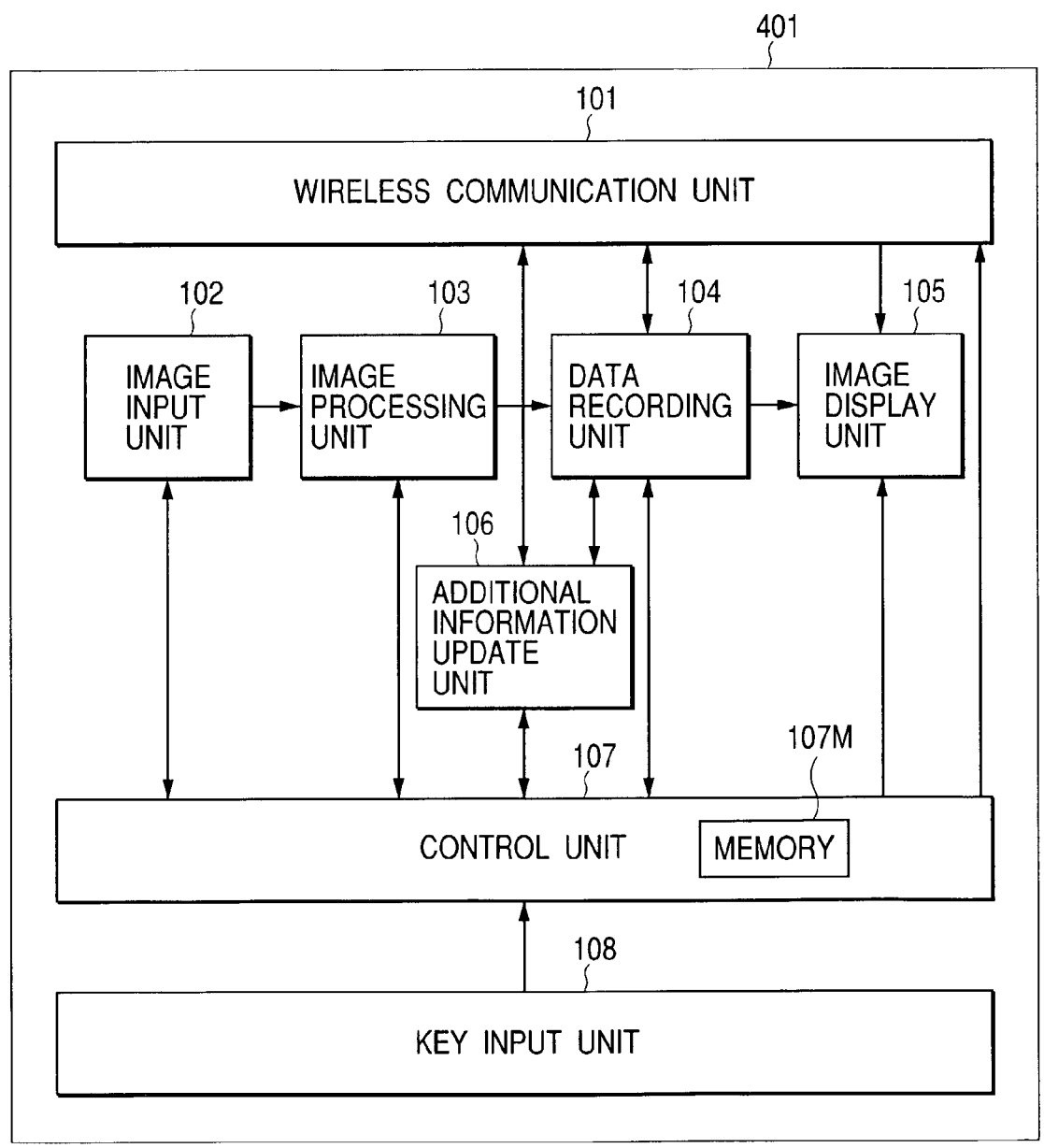
FIG. 1 is a diagram showing a configuration of an imaging apparatus in a first embodiment of the present invention.
Figure 2:
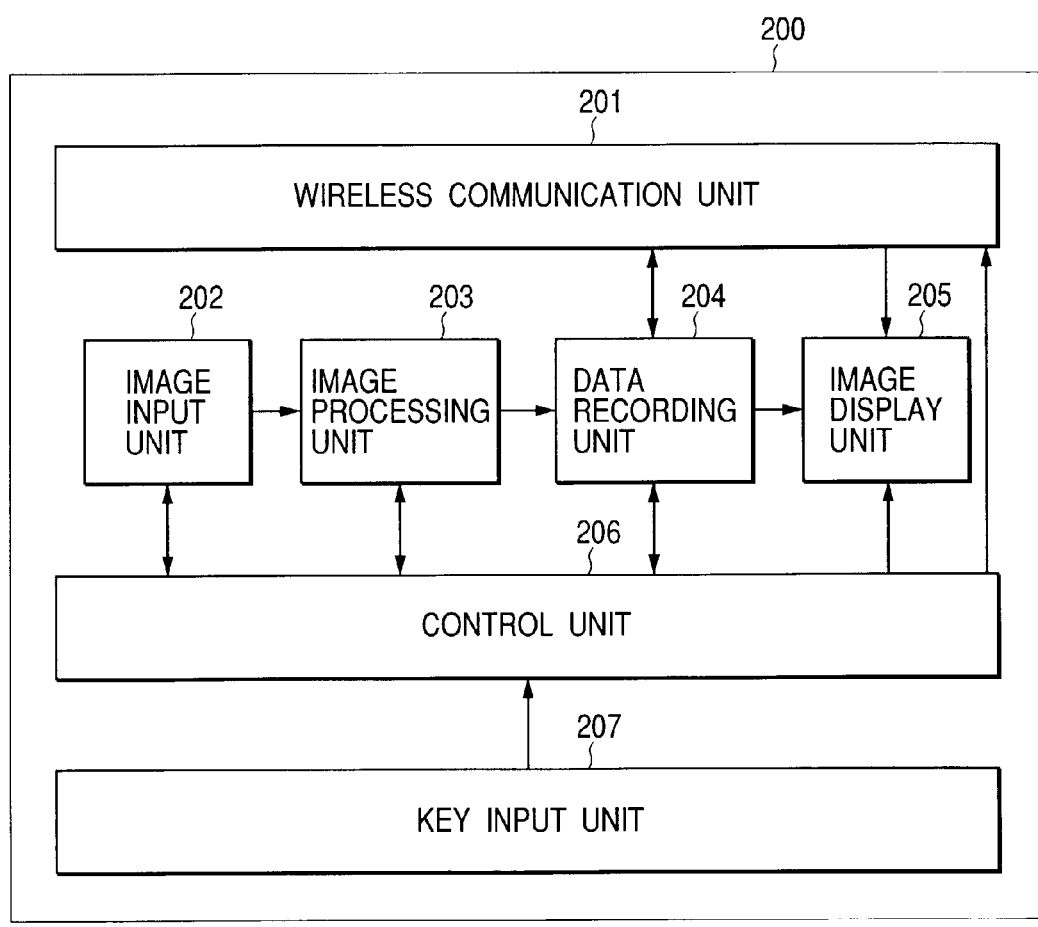
FIG. 2 is a diagram showing a configuration of a conventional imaging apparatus.
Figure 3:
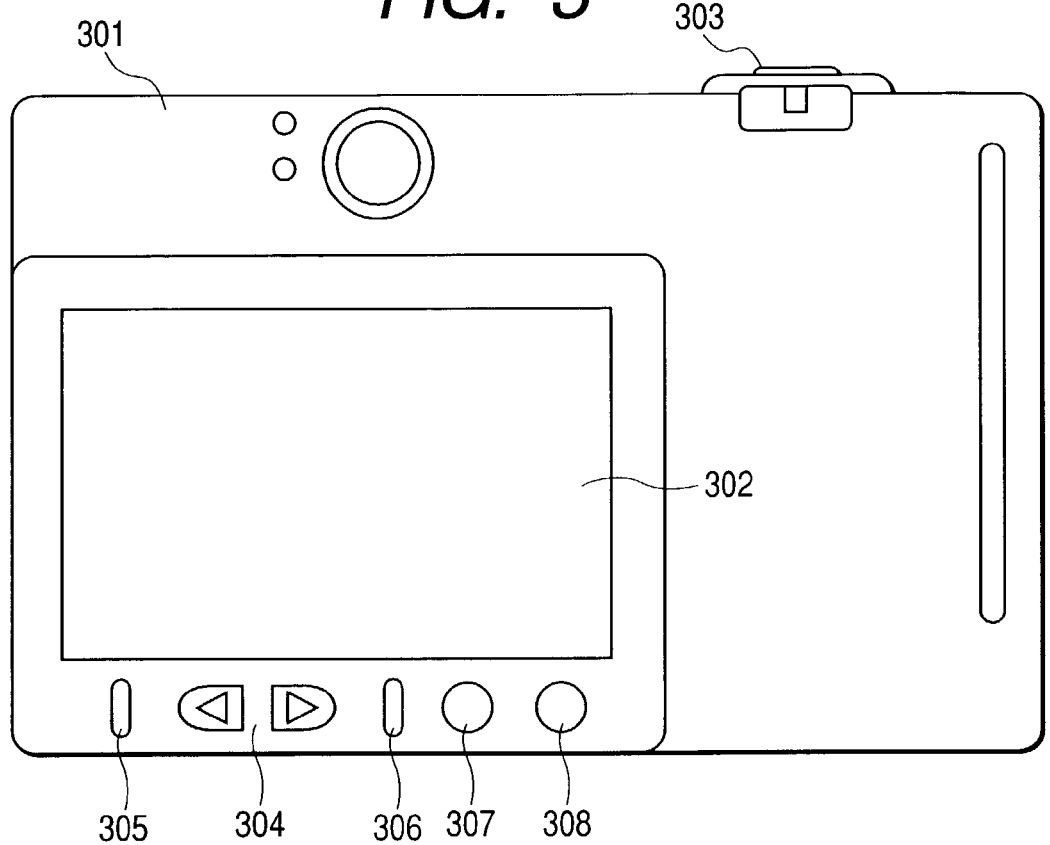
FIG. 3 is a view illustrating a standard input interface of the imaging apparatus.

FIG. 1 is a diagram showing a configuration of an imaging apparatus 401 in a first embodiment of the present invention.

An optical image inputted from an image input unit 102 constructed of an optical element such as a lens, is converted from optical data into electronic data by an image processing unit 103 and, after undergoing a compression process etc, stored on a data recording unit 104. The image processing unit 103 includes a photoelectric converting element for converting a photographed image into image data. According to one mode of the present invention, the data recording unit 104 stores a detachable memory with the image data together with additional data. The additional data contain a name of the image data (a file name), a photo date/time and so on.

The image display unit 105 displays the inputted optical image as it remains electronically converted when in a photographing process, and displays the stored image data when in a reproducing process. Further, pieces of information such as a present date/time, photographing conditions etc and a state of a wireless communication unit 101 other than the image information, are displayed on the display unit 105 under the control of a control unit 107.

Herein, the image may be either a static (still) image or a dynamic (moving) image. The imaging apparatus 401 is a digital camera or a digital video.

A key input unit 108 is an interface used for a user to operate the imaging apparatus, and the control unit 107 processes pieces of operating information thereof, thereby executing necessary operations. Note that the symbol 107M represents a memory.

In the case of using the wireless function for transferring and receiving the normal image data, the control unit 107 controls the wireless communication unit 101 and the data recording unit 104 in accordance with a command given through the key input unit 108, and transmits the image data within the data recording unit 104 via the wireless communication unit 101 or saves on the data recording unit 104 the image data received through the wireless communication unit 101.

On the occasion of modifying the additional information such as modifying the file name and the photo date/time, adding a photographing condition and so on, in a state of being connected to other device through the wireless communication unit 101, an additional information update unit 106 controls a transfer and a receipt of the additional information to and from the other device in accordance with a command issued from the control unit 107.

Note that the additional information update unit 106 is provided between the wireless communication unit 101 and the control unit 107 in FIG. 1, however, a possible scheme is that the control unit 107 is provided with a function of the additional information update unit 106 without providing the additional information update unit 106, and the wireless communication unit 101 and the control unit 107 directly transfer and receive the additional information to and from each other.

The additional information update unit 106 operates upon an input from the key input unit 108 of the imaging apparatus 401 with respect to necessary steps on the occasion of updating the information such as selecting an item and so forth, and controls to prompt a user of the other wirelessly-connected device to input an actual file name etc therefrom with respect to inputting of complicated text data.

The text data inputted from the other device are inputted via the wireless communication unit 101 to the additional information update unit 106, and the additional information attached to a desired item of image data within the data recording unit 104 is updated.

Further, according to one embodiment of the present invention, the additional information attached to the desired item of image data obtained through the additional information update unit 106 is transmitted via the wireless communication unit 101 to the other device, thereby displaying the additional information on the other wirelessly-connected device.

Next, a specific method of modifying the additional information in the state of being actually wirelessly connected to the other device, will be exemplified.

Figure 4:
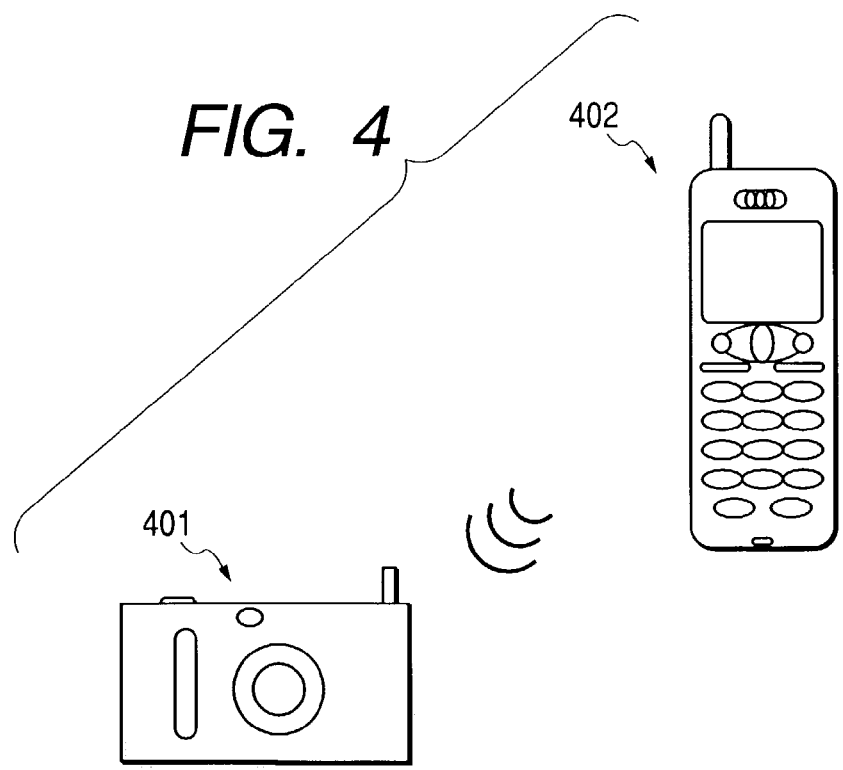
FIG. 4 is a view showing a device-to-device configuration in the first embodiment of the present invention.

Herein, as shown in FIG. 4, the following discussion is based on a mode in which the other device including a highly advanced input device is a cellular phone 402. Further, a premise is that the wireless function preinstalled imaging apparatus 401 and the cellular phone 402 in this embodiment are connected by Bluetooth in a short-range simple radio link system.

Note that the device wirelessly connected to the imaging apparatus 401 and inputting the additional data is not limited to the cellular phone and may be wireless communication devices such as a personal computer, an electronic note etc having a function of wirelessly communicating with the imaging apparatus 401.

Figure 5:
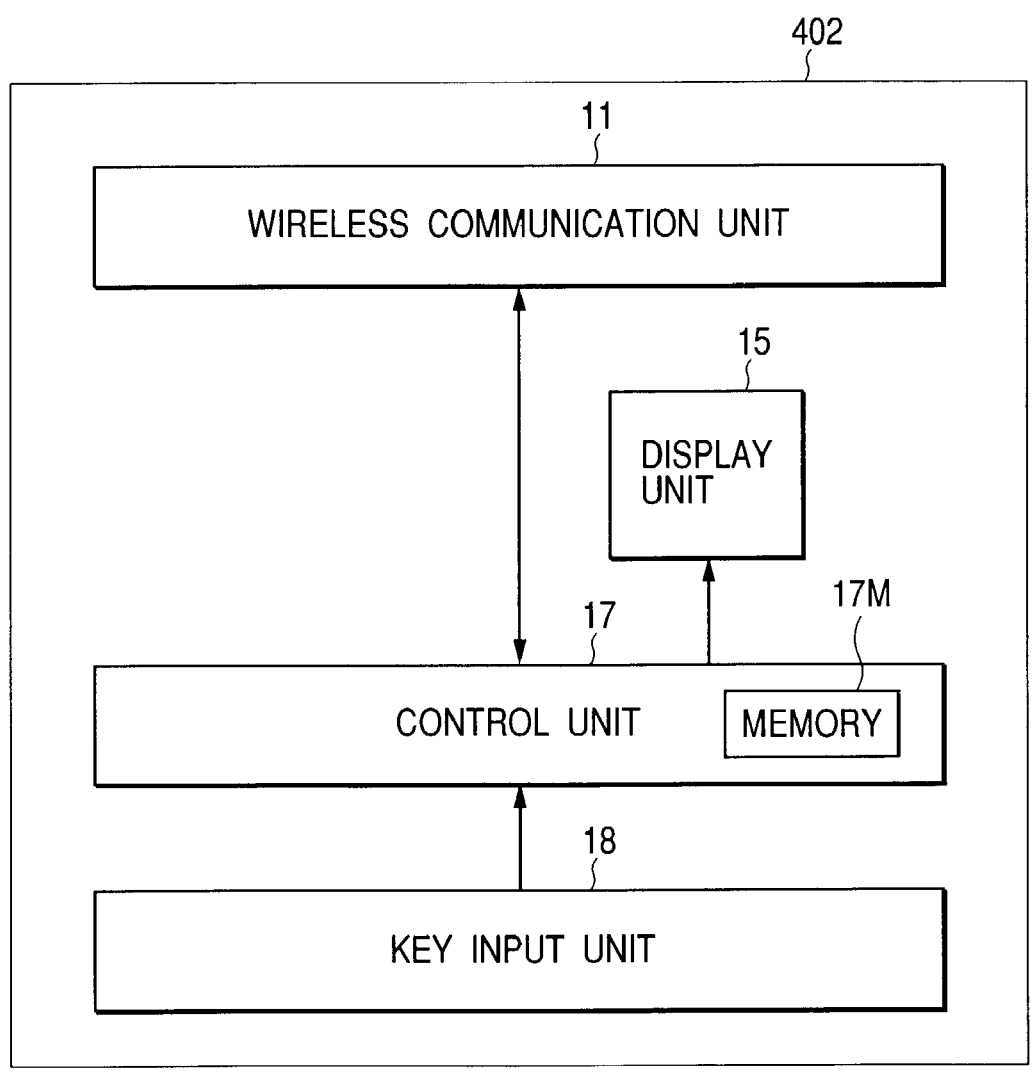
FIG. 5 is a diagram showing an architecture of a cellular phone in the first embodiment.

FIG. 5 illustrates a configuration of the cellular phone 402. Referring to FIG. 5, there are shown a wireless communication unit 11, a display unit 15, a control unit 17, a memory 17M and a key input unit 18. The wireless communication unit 11 performs local communications with the wireless communication unit 101 of the imaging apparatus 401 and also public wireless communications with an unillustrated public radio base station. The public radio communications involve utilizing IMT (International Mobile Telecommunications) 2000.

Figure 6:
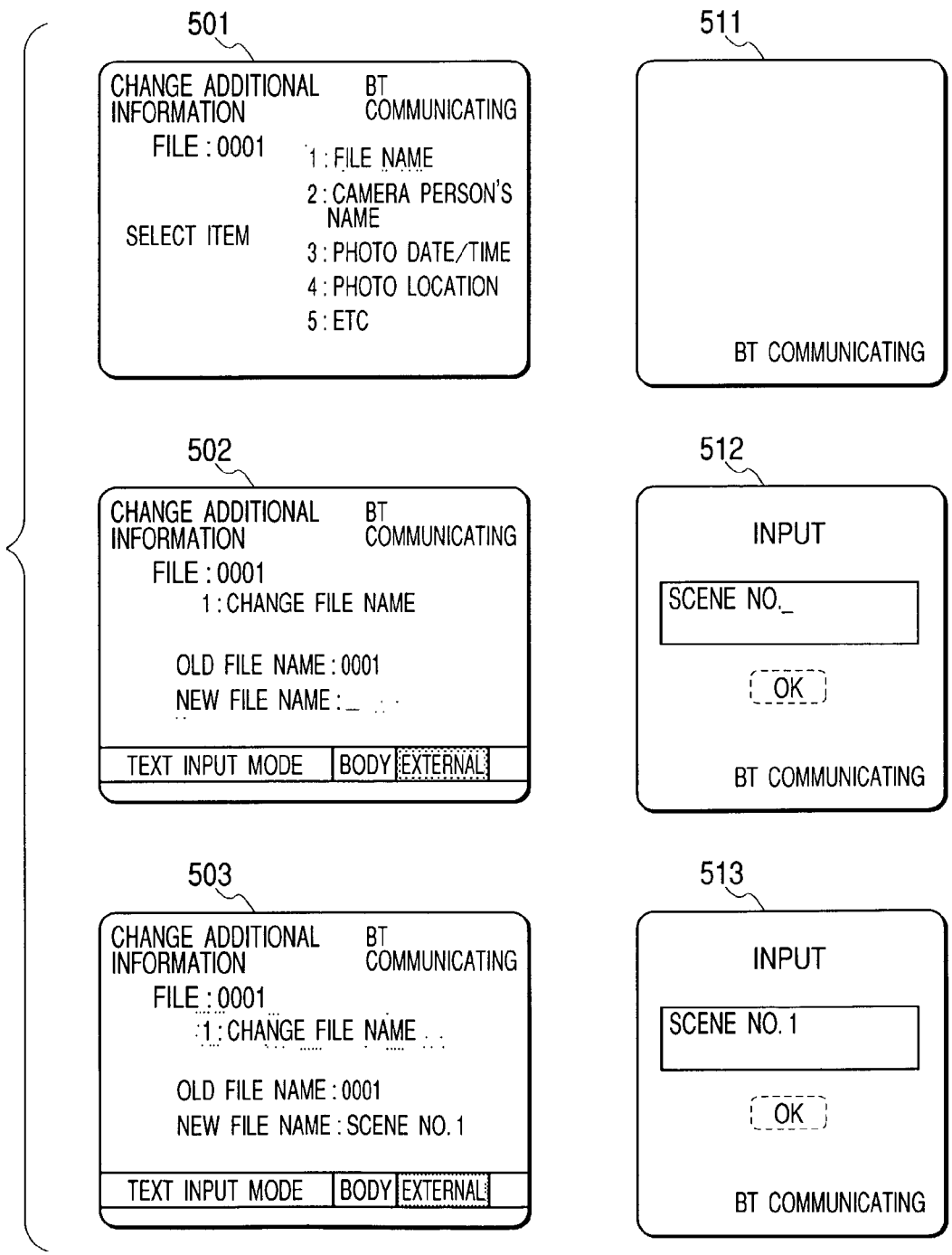
FIG. 6 is a diagram showing screen displays on the imaging apparatus and on the cellular phone connected thereto in the first embodiment of the present invention.

FIG. 6 is a diagram showing contents displayed on respective screens of the wireless function preinstalled imaging apparatus 401 and the cellular phone 402 connected to the wireless function preinstalled imaging apparatus 401 in this embodiment.

Referring to FIG. 6, the numerals 501 through 503 indicate the contents displayed on the display unit 105 of the imaging apparatus 401, and the numerals 511 through 513 indicate the contents displayed on the display unit 15 of the cellular phone 402. Note that an indication of a call receiving state and an indication of the present time are, though installed as normal display functions of the cellular phone 402, omitted herein for an explanatory simplicity in the discussion on this embodiment. Further, an assumption is that the Bluetooth-based connection has already been established. This is recognized by displaying (BT communicating) on the screen. Herein, a file name, a camera person's name, a photo date/time and a photo location are examples in category of the additional information of the image.

Figure 7:
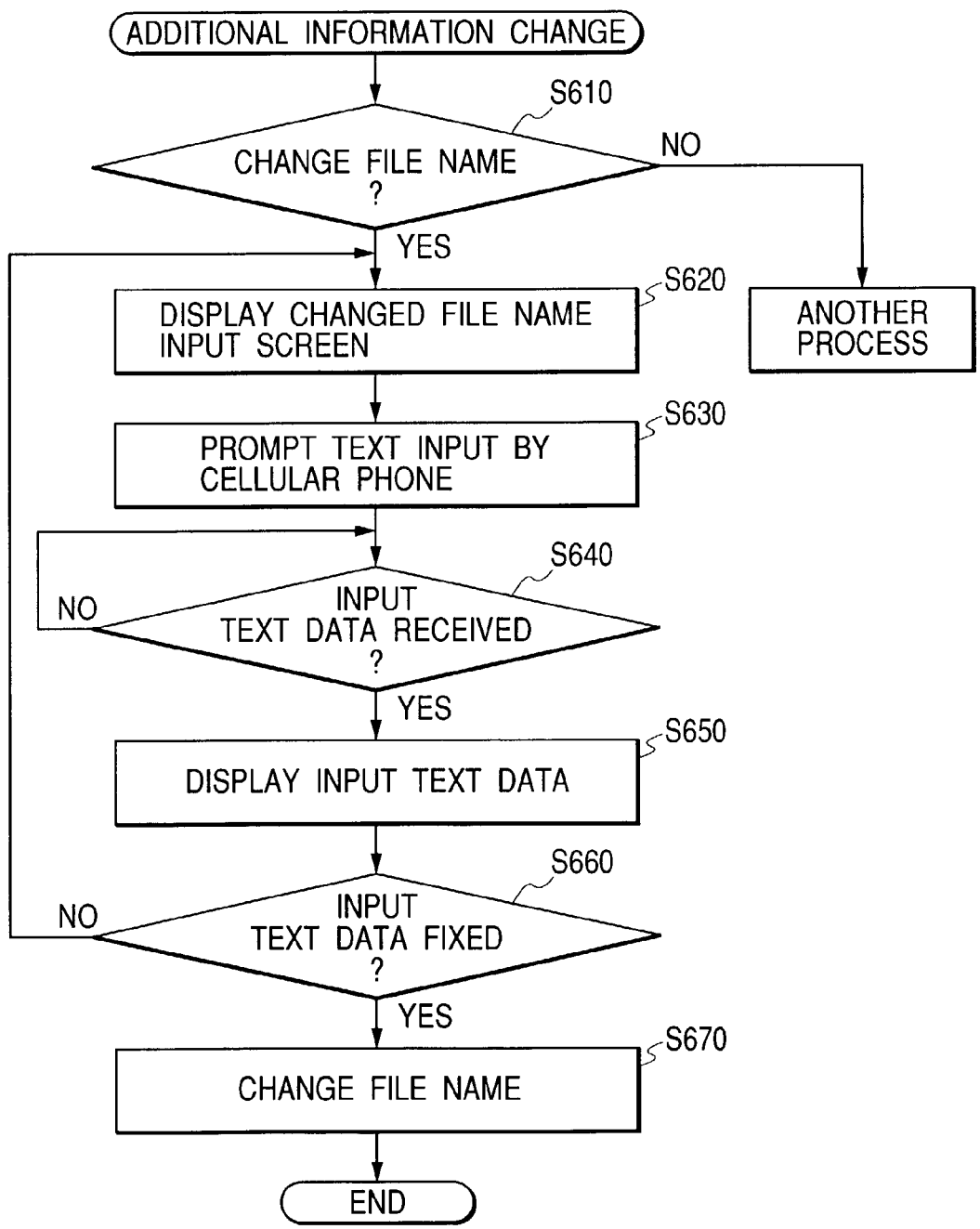
FIG. 7 is a flowchart for the imaging apparatus in the first embodiment.
Figure 8:
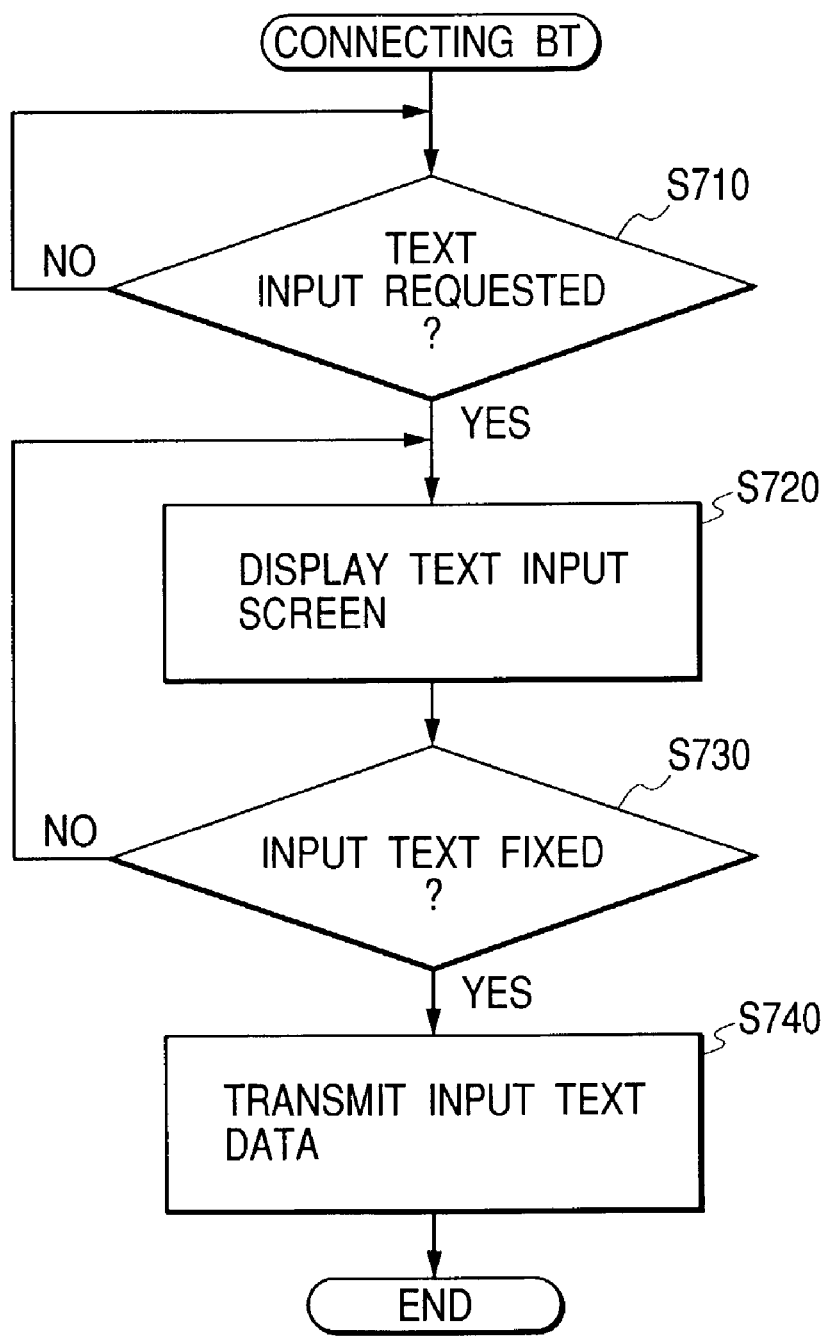
FIG. 8 is a flowchart for the cellular phone in the first embodiment.

FIG. 7 is a flowchart for the control unit 107 of the imaging apparatus 401. FIG. 8 is a flowchart for the control unit 17 of the cellular phone 402. FIG. 7 shows a part of programs stored on the memory 107M. FIG. 8 shows a part of the program stored on the memory 17M. The control units 107, 17 may be defined as computers operating by reading these programs from the memories 107M, 17M. The memories 107M, 17M are storage mediums stored with these programs in a way that enables the control units 107, 17 to read these programs.

The program shown by the flowchart in FIG. 7 may be stored on the memory 107M from outside via the wireless communication unit 101. Further, in a mode wherein this program is stored a memory card and the control unit 107 reads this program by use of an unillustrated memory reader and stores the program on the memory 107M, this memory card corresponds to a storage medium stored with the program in a way of its being readable by the control unit 107. Given hereinafter is an explanation of operations of the imaging apparatus 401 and the cellular phone 402 under the control of the control units 107, 17 operating based on the programs shown in FIGS. 7 and 8.

The imaging apparatus 401 is in the process of operating in a play mode, and a specific image is selected from among thumbnail display images of the saved image data by use of the key input unit 108. Thereafter, in a state where an additional information modification menu of the selected image data is selected, the contents displayed at this time on the display unit 105 of the imaging apparatus 401 and on the display unit 15 of the cellular phone 402, are as on the screens 501 and 511. To be specific, the screen 501 for selecting items to be modified is displayed on the imaging apparatus 401, while the screen 511 indicating the Bluetooth connection being kept is displayed on the cellular phone 402.

When a modification of "file name" is selected on the screen 501 by manipulating the key input unit 108 (step S610), the screen 501 on the display unit 105 changes to the screen 502 that is an input screen for inputting an actual file name (step S620). AT this time, a cursor is also located on "outside", displayed in a lower area on the screen 502, indicating that the characters are inputted from outside through the Bluetooth connection. Moreover, the imaging apparatus 401 requests, through the wireless communication unit 101 thereof, the cellular phone 402 to input the characters (step S630).

The wireless communication unit 11 of the cellular phone 402 receives the request given in step S630 from the imaging apparatus 401 (step S710), the request being triggered by a change to the character input request menu on the imaging apparatus 401, whereby the screen 512 for prompting the user to input the characters is displayed on the display unit 15 (step S720). Herein, a character input function installed into the cellular phone 402 itself is invoked in response to the request of the additional information update unit 106 within the imaging apparatus 401 on the basis a protocol for the external connection interface of the cellular phone 402. A message (Input characters) on the screen 512 indicates that the character input function has been invoked. Further, on the screen 512, there is displayed a state where the user inputs (Scene part . . . ) by operating ten keys etc of the key input unit 18 of the cellular phone 402.

Note that a selection of the additional information modification menu and a selection of modification of the file name in step S510 in addition to inputting the file name are made by using the key input unit 18 of the cellular phone 401 in other embodiments of the present invention.

After inputting (Scene part 1) on the screen 513, (OK) is selected on the display unit 205, and the inputting of the characters is established on the cellular phone 402 (step S730). Then, the wireless communication unit 11 executes the Bluetooth-based text data communication with the wireless communication unit 101 (steps S740, S640), whereby the inputted character data are displayed on the display screen 503 of the display unit 105 of the imaging apparatus 401 (step S650). Eventually, an operation of establishing the inputted character data on the side of the imaging apparatus 401 is effected by using the key input unit 108 (step S660), thereby completing the modification of the file name of the image data concerned within the data recording unit 104 (step S670). This file name is one example of the additional data attached to the image data. Pieces of information on the photographer etc other than the file name may also be changed.

In the discussion made so far, the image is specified and the selection in step S610 is made by manipulating the key input unit 108 of the imaging apparatus 401. According to the modified example of this embodiment, however, the imaging apparatus 401 is remotely controlled by manipulating the key input unit 207 of the cellular phone 402, thereby specifying the image and making the selection in step S610. In this modified example, the establishing operation in step S660 may be omitted.

Moreover, according to another embodiment of the present invention, after selecting a specified image from among thumbnail display images of the saved image data by using the key input unit 108, a transmission of the selected image data to the cellular phone 402 is selected, the imaging apparatus 401 displays an additional information modification screen 501. Then, when the additional information is inputted from the cellular phone 402, the imaging apparatus 401 modifies the additional information and, when operated to establish the additional information, transmits the image data to the cellular phone 402.

According to still another embodiment of the present invention, in a state where the cellular phone 402 is wirelessly connected to the imaging apparatus 401, the image data stored on the imaging apparatus 401 are selected, and a transmission of the image data via a public wireless circuit is selected. In this case, the cellular phone 402 displays an additional information input screen (e.g., a file name input screen 512) on the display unit 15. The selection of the transmission thereof is made in a way that displays, for instance, (1: transmit the image of the imaging apparatus) etc on the display unit 15 after selecting the image data and inputs (1) by manipulating the ten keys of the key input unit 18 of the cellular phone 402. Thereafter, the imaging apparatus 401 receives the file name inputted on the cellular phone 402, and changes the image data file name saved on the data recording unit 104 to the file name inputted on the cellular phone 402. Thereafter, when indicated from the cellular phone 402 to transmit, the image data given the file name inputted by the ten keys of the cellular phone 402 are read from the data recording unit 104 and transmitted to a destination via the wireless communication unit 101, the cellular phone 402 and the public wireless circuit. The destination is specified by using the ten keys of the cellular phone 402 before indicating the transmission.

Moreover, according to one mode of the present invention, when transmitting the image data to the cellular phone 402, the additional information update unit 106 rewrites a part or the whole of the additional information as inputted on the cellular phone 402 in accordance with preset additional information rewriting procedures. Take a case in FIG. 6 for example, firstly the file name, secondly the camera person's name, thirdly the photo date/time and fourthly the photo location are sequentially rewritten. All these items may be rewritten in this sequence, or only a part of the data may also be rewritten in a predetermined sequence.

Further, according to another mode of the present invention, in the case of transmitting the image data to the destination from the imaging apparatus 401 via the cellular phone 402 and the public line network by utilizing the public radio communication function of the cellular phone 402, the information of the destination is written as additional information attached to the image data to the data recording unit 104.

Moreover, according to still another mode of the present invention, the imaging apparatus 401 is connected to other device via the cellular phone 402 and the public wireless circuit by utilizing the public radio communication function of the cellular phone 402, the other device connected via the public wireless circuit inputs the additional information such as the file name etc, and the inputted additional information is received by the imaging apparatus 401 via the public wireless circuit and the cellular phone 402 from the other device and recorded on the data recording unit 104.

Furthermore, according to a further mode of the present invention, when transmitting the image data to a destination party connected through the public wireless circuit via the cellular phone 402, the additional information update unit 106 rewrites a part or the whole of the additional information as inputted by the other device connected through the public wireless circuit in accordance with the preset additional information rewriting procedures.

Note that the imaging apparatus 401 and the cellular phone 402 are linked based on the Bluetooth connection, however, as a substitute for Bluetooth, the wireless communication unit 101 may be provided with the public wireless communication function and connected to the cellular phone through the public wireless circuit.

Figure 9:
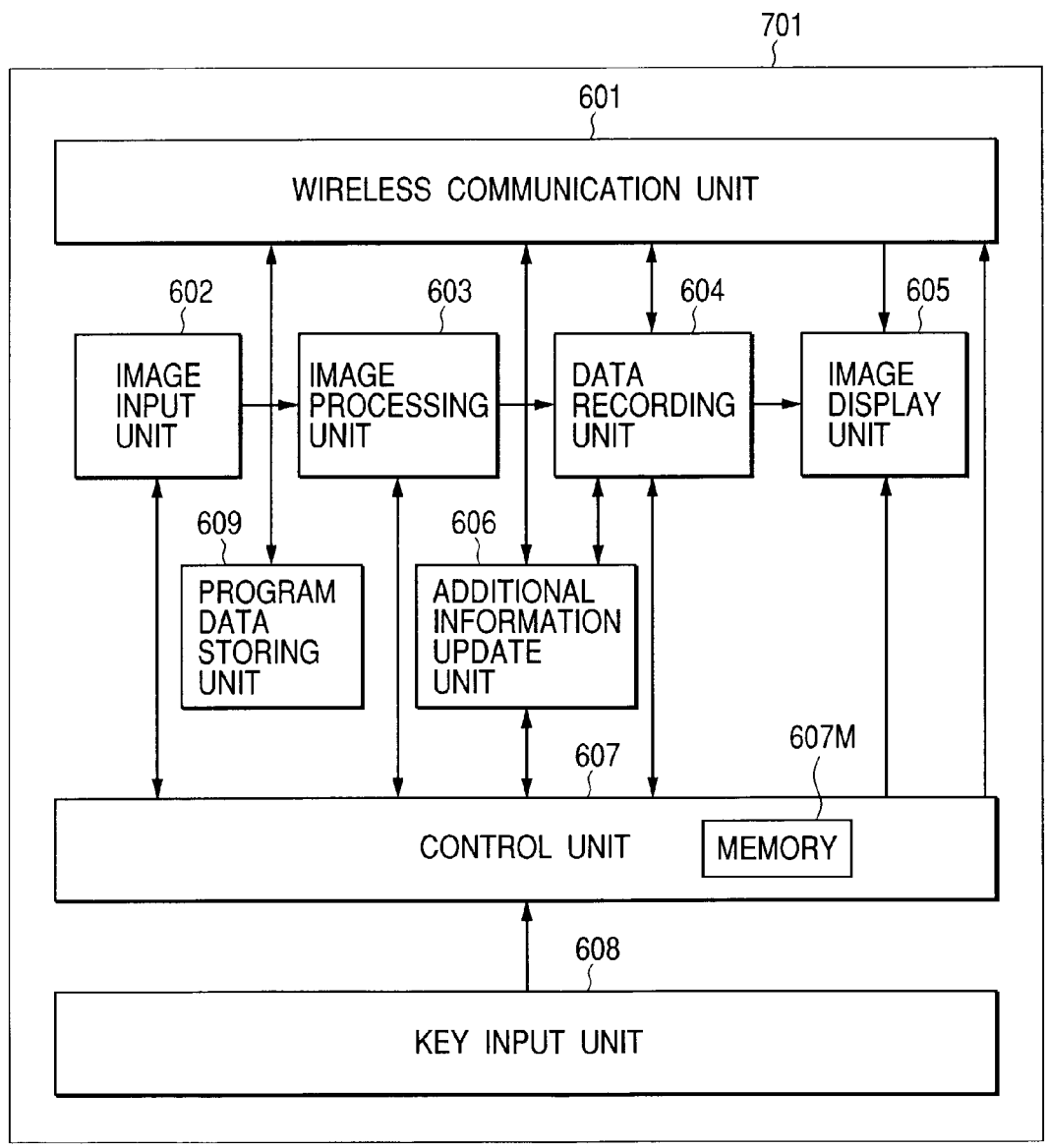
FIG. 9 is a diagram showing a configuration of the imaging apparatus in a second embodiment of the present invention.

FIG. 9 is a diagram showing an architecture of an imaging apparatus 701 in the second embodiment of the present invention.

An optical image inputted from an image input unit 602 constructed of an optical element such as a lens, is converted from optical data into electronic data by an image processing unit 603 and, after undergoing a compression process etc, stored on a data recording unit 604. The image processing unit 603 includes a photoelectric converting element for converting a photographed image into image data. According to one mode of the present invention, the data recording unit 604 stores a detachable memory with the image data together with additional data. The additional data contain a name of the image data (a file name), a photo date/time and so on.

The image display unit 605 displays the inputted optical image as it remains electronically converted when in a photographing process, and displays the stored image data when in a reproducing process. Further, pieces of information such as a present date/time, photographing conditions etc and a state of a wireless communication unit 601 other than the image information, are displayed on the display unit 605 under the control of a control unit 607.

Herein, the image may be either a static image or a dynamic image. The imaging apparatus 701 is a digital camera or a digital video.

A key input unit 608 is an interface used for the user to operate the imaging apparatus, and the control unit 607 processes pieces of information thereof, thereby executing necessary operations. Note that the symbol 707M represents a memory.

In the case of using the wireless function for transferring and receiving the normal image data, the control unit 607 controls the wireless communication unit 601 and the data recording unit 604 in accordance with a command given through the key input unit 608, and transmits the image data within the data recording unit 604 via the wireless communication unit 601 or saves on the data recording unit 604 the image data received through the wireless communication unit 601.

On the occasion of modifying the additional information such as modifying the file name and the photo date/time, adding a photographing condition and so on by other device having the normal wireless connection interface stated in the discussion on the first embodiment, in a state of being connected to other device through the wireless communication unit 601, an additional information update unit 606 controls a transfer and a receipt of the additional information to and from the other device in accordance with a command issued from the control unit 607. Note that the additional information update unit 606 is provided between the wireless communication unit 601 and the control unit 607 in FIG. 9, however, a possible scheme is that the control unit 607 is provided with a function of the additional information update unit 606 without providing the additional information update unit 606, and the wireless communication unit 601 and the control unit 607 directly transfer and receive the additional information to and from each other.

The additional information update unit 606 operates upon an input from the key input unit 608 of the imaging apparatus 701 with respect to necessary steps on the occasion of updating the information such as selecting an item and so forth, and controls to prompt a user of the other wirelessly-connected device to input an actual file name etc therefrom with respect to inputting of complicated text data. The text data inputted from the other device are inputted via the wireless communication unit 601 to the additional information update unit 606, and the additional information attached to a desired item of image data within the data recording unit 604 is updated.

Further, according to one embodiment of the present invention, the additional information attached to the desired item of image data obtained through the additional information update unit 606 is transmitted via the wireless communication unit 601 to the other device, thereby displaying the additional information on the other wirelessly-connected device.

Further, if a connection target device is a cellular phone implementing a standard execution environment (platform) such as Java and C Programming Language for downloading and executing additional program data in addition to having the normal wireless connection interface, the following functions are further actualized in this embodiment.

If the connection target device is judged to be a terminal implementing the standard execution environment for the external program in the state of being connected to the other device via the wireless communication unit 601, to start with, the program data corresponding to the execution environment is transmitted from a program data storing unit 609 through the wireless communication unit 601 under the control of the control unit 607.

This program serves to actualize the function of the additional information update unit 606 on the standard execution environment, and is used for enabling I/O processes of all the commands and text data to be executed on the other connected device, including the transfer and receipt of the image data and thumbnail data thereof.

Next, procedures of modifying the additional information are specifically shown in the standard execution environment on the other wirelessly-connected device on the basis of the program data transmitted.

Figure 10:
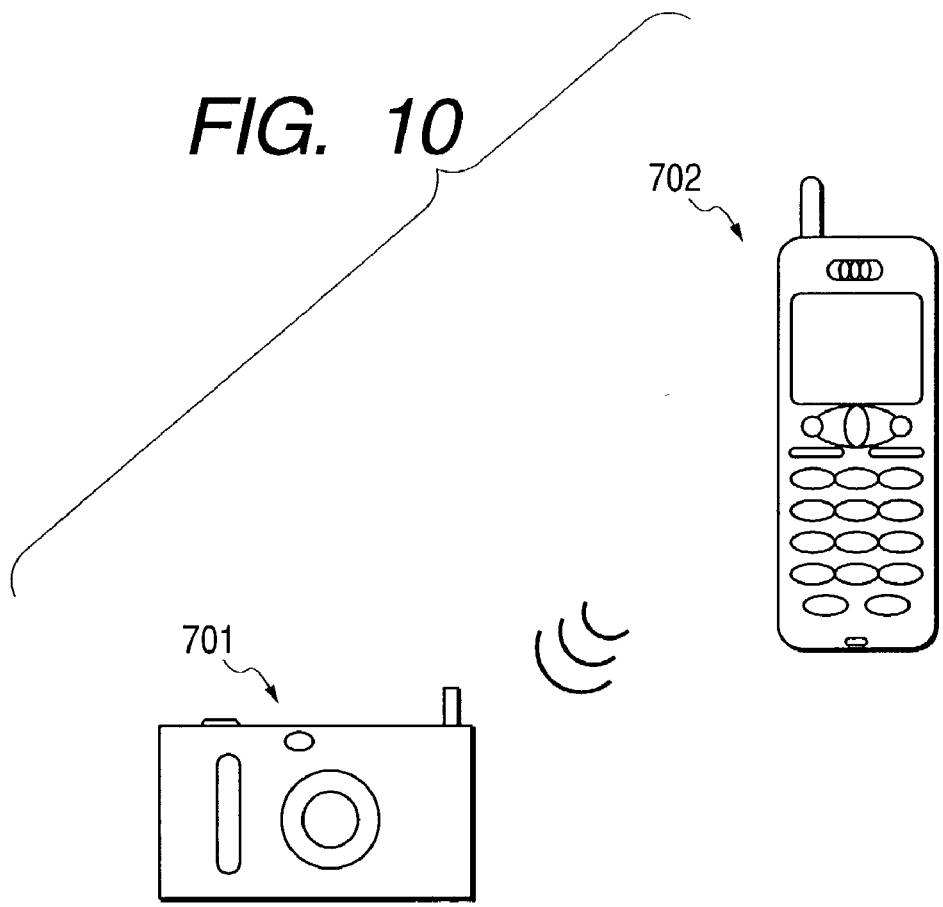
FIG. 10 is a diagram showing a device-to-device configuration in the second embodiment of the present invention.

A mode in which the other device including a highly advanced input device is a cellular phone as illustrated in FIG. 10, will be explained. Further, a premise is that the wireless function preinstalled imaging apparatus 701 and the cellular phone 702 in this embodiment are connected by Bluetooth in the short-range simple radio link system. Note that the device wirelessly connected to the imaging apparatus 701 and inputting the additional data is not limited to the cellular phone and may be wireless communication devices such as a personal computer, an electronic note etc having a function of wirelessly communicating with the imaging apparatus 701.

The cellular phone 702 implementing Java platform as the standard execution environment downloads a program from on the network connected to the public circuit or from other locally-connected device, whereby a new function other than the functions preinstalled in the cellular phone 702 itself can be added to this cellular phone 702.

Figure 11:
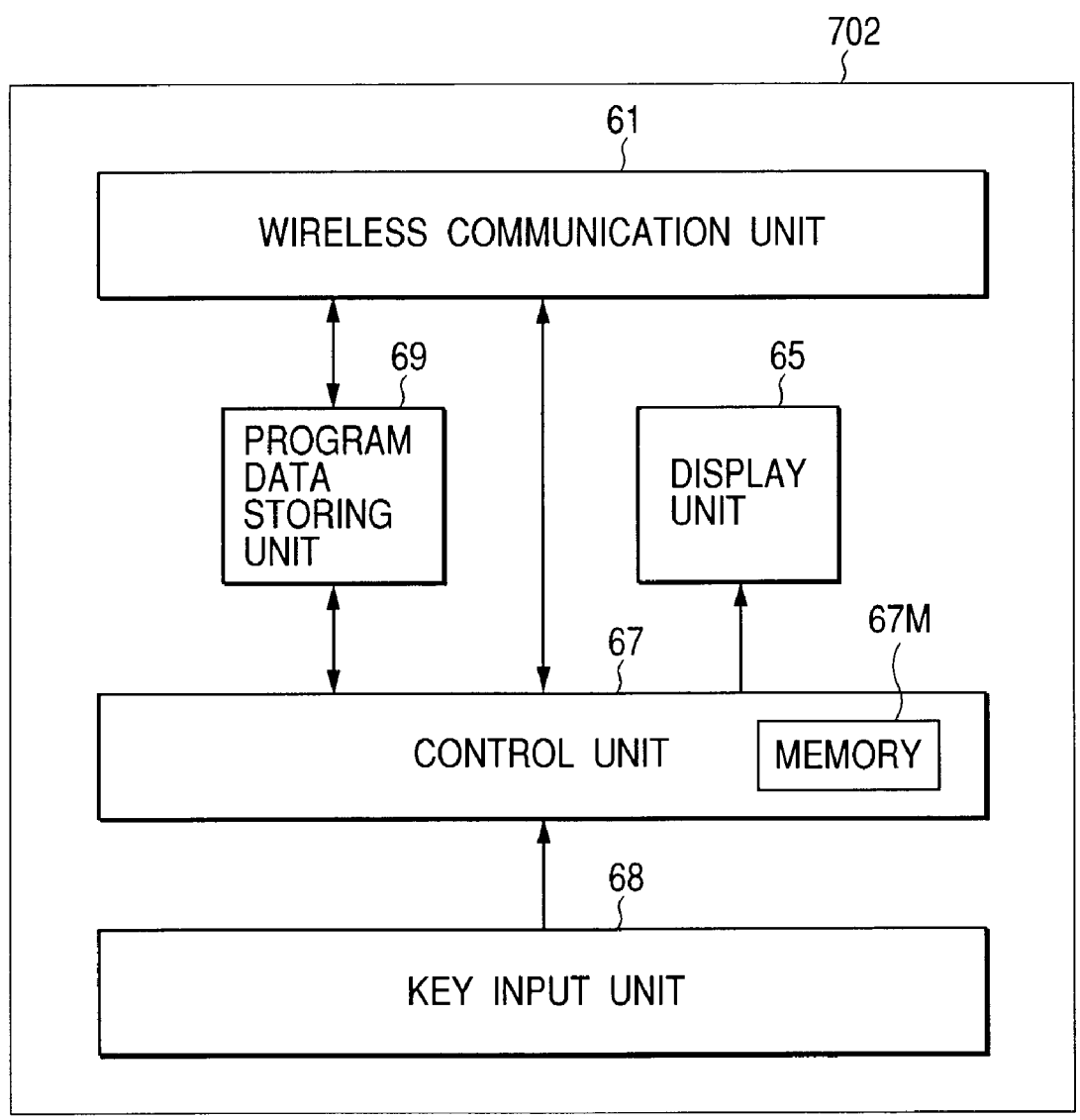
FIG. 11 is a diagram showing an architecture of the cellular phone in the second embodiment.

FIG. 11 illustrates a configuration of the cellular phone 702. There are shown a wireless communication unit 61, a display unit 65, a control unit 67, a memory 67M, a key input unit 68 and a program data storing unit 69. The wireless communication unit 61 performs local communications with the wireless communication unit 601 of the imaging apparatus 701 and also public wireless communications with an unillustrated public radio base station. The public radio communications involve utilizing IMT (International Mobile Telecommunications) 2000.

Figure 12:
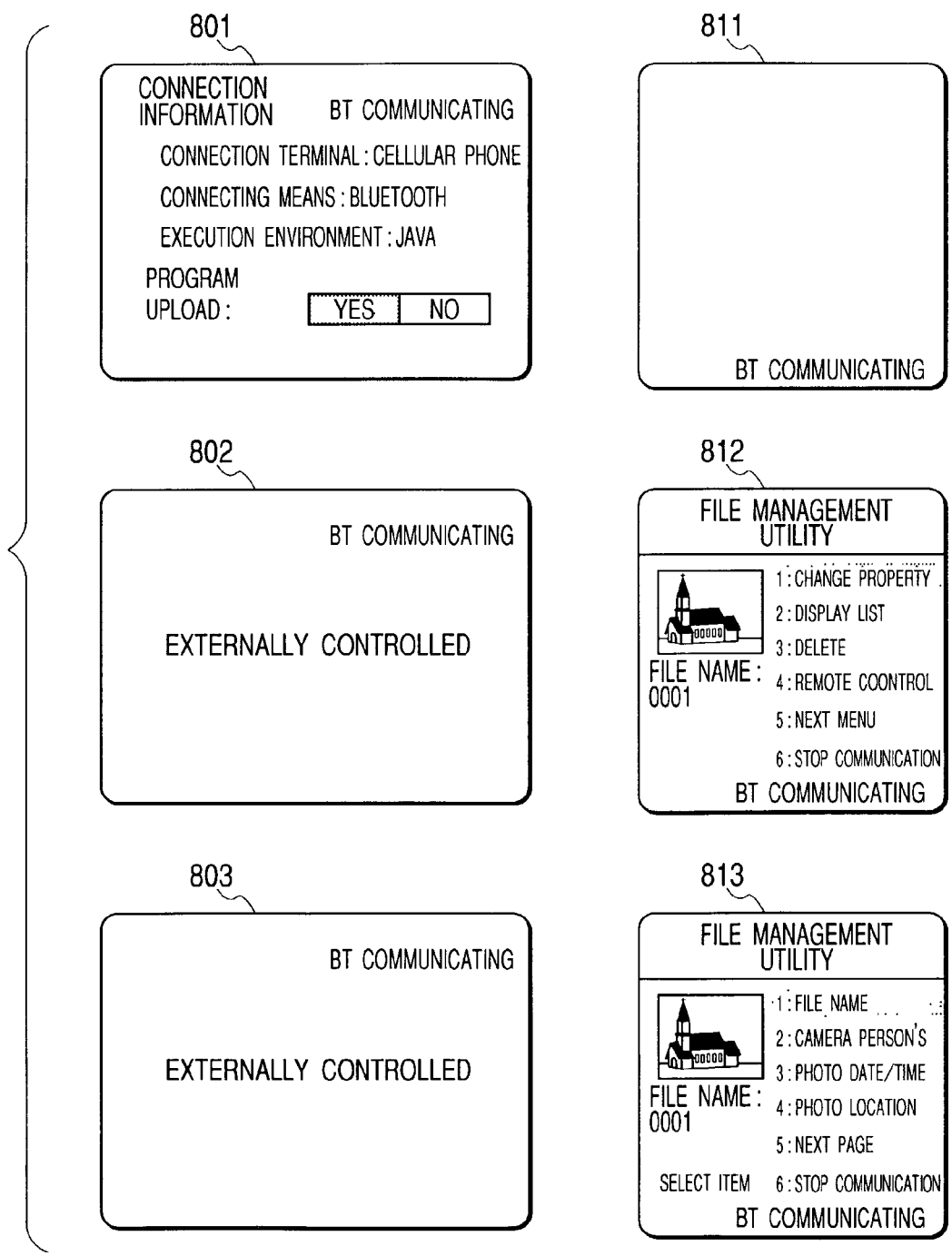
FIG. 12 is a diagram showing screen displays on the imaging apparatus and on the cellular phone connected thereto in the second embodiment of the present invention.
Figure 13:
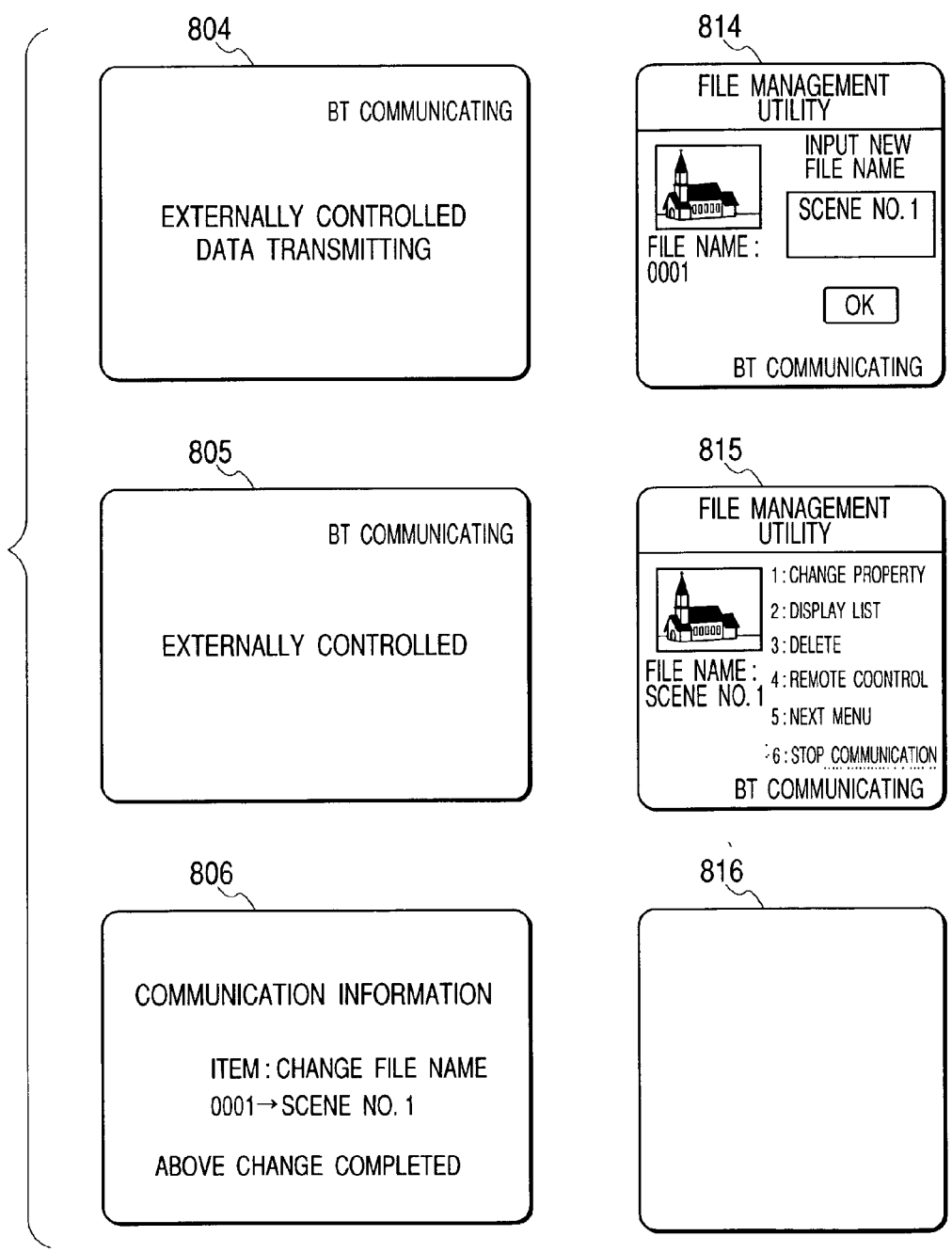
FIG. 13 is a diagram showing screen displays on the imaging apparatus and on the cellular phone connected thereto in the second embodiment of the present invention.

FIGS. 12 and 13 are diagrams each showing contents displayed on respective screens of the wireless function preinstalled imaging apparatus 701 and the cellular phone 702 connected to the wireless function preinstalled imaging apparatus 701 in this embodiment.

The numerals 801 through 806 indicate the contents displayed on the display unit 605 of the imaging apparatus 701, and the numerals 811 through 816 indicate the contents displayed on the display unit 65 of the cellular phone 702. Note that an indication of a call receiving state and an indication of the present time are, though installed as normal display functions of the cellular phone 702, omitted herein for an explanatory simplicity in the discussion on this embodiment. Further, an assumption is that the Bluetooth-based connection has already been established. This is recognized by displaying (BT communicating) on the screen. Herein, (property) is the addition information of the image, and a file name, a camera person's name, a photo date/time and a photo location are examples in category of the additional information of the image.

Figure 14:
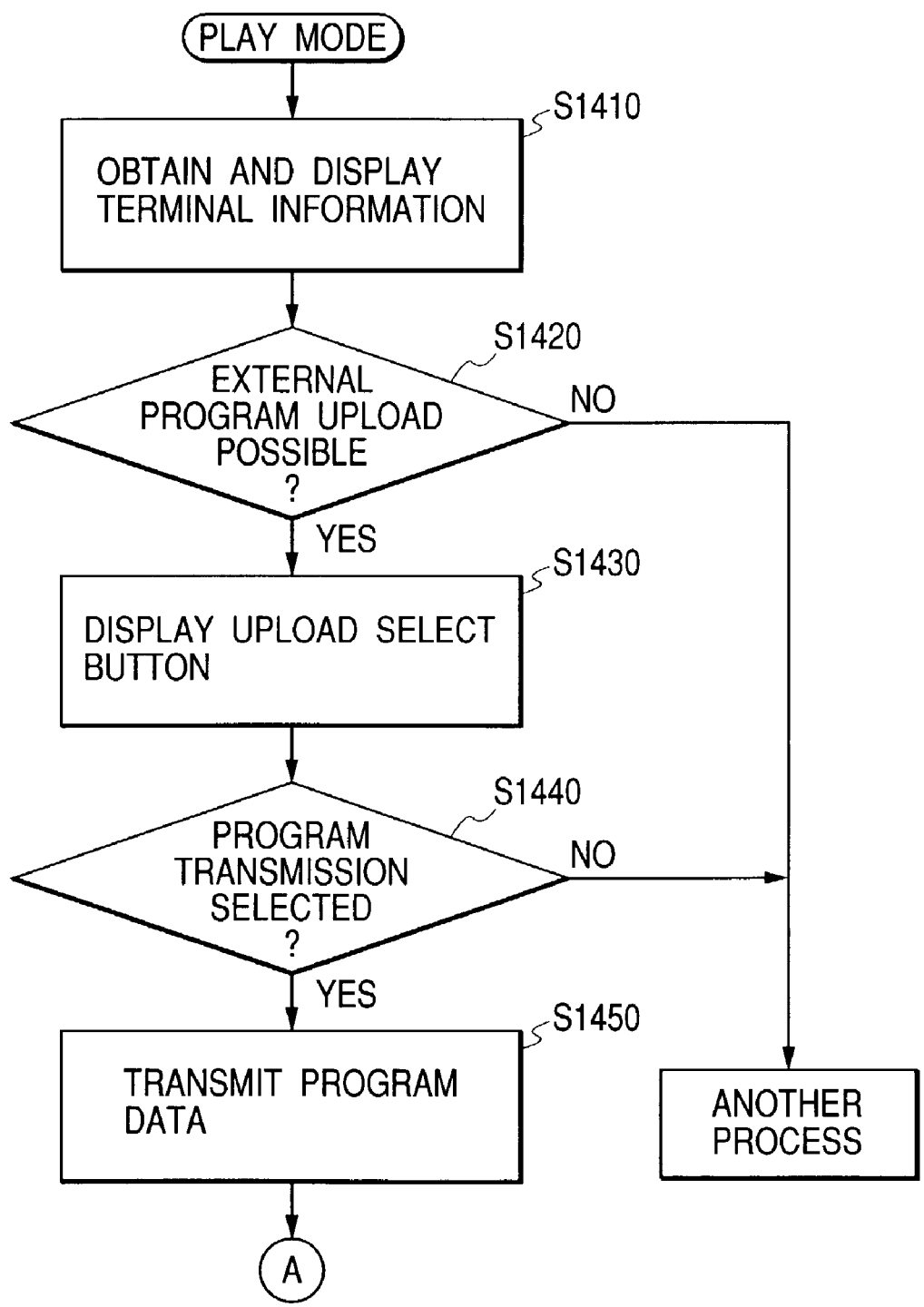
FIG. 14 is a flowchart for the imaging apparatus in the second embodiment.
Figure 15:
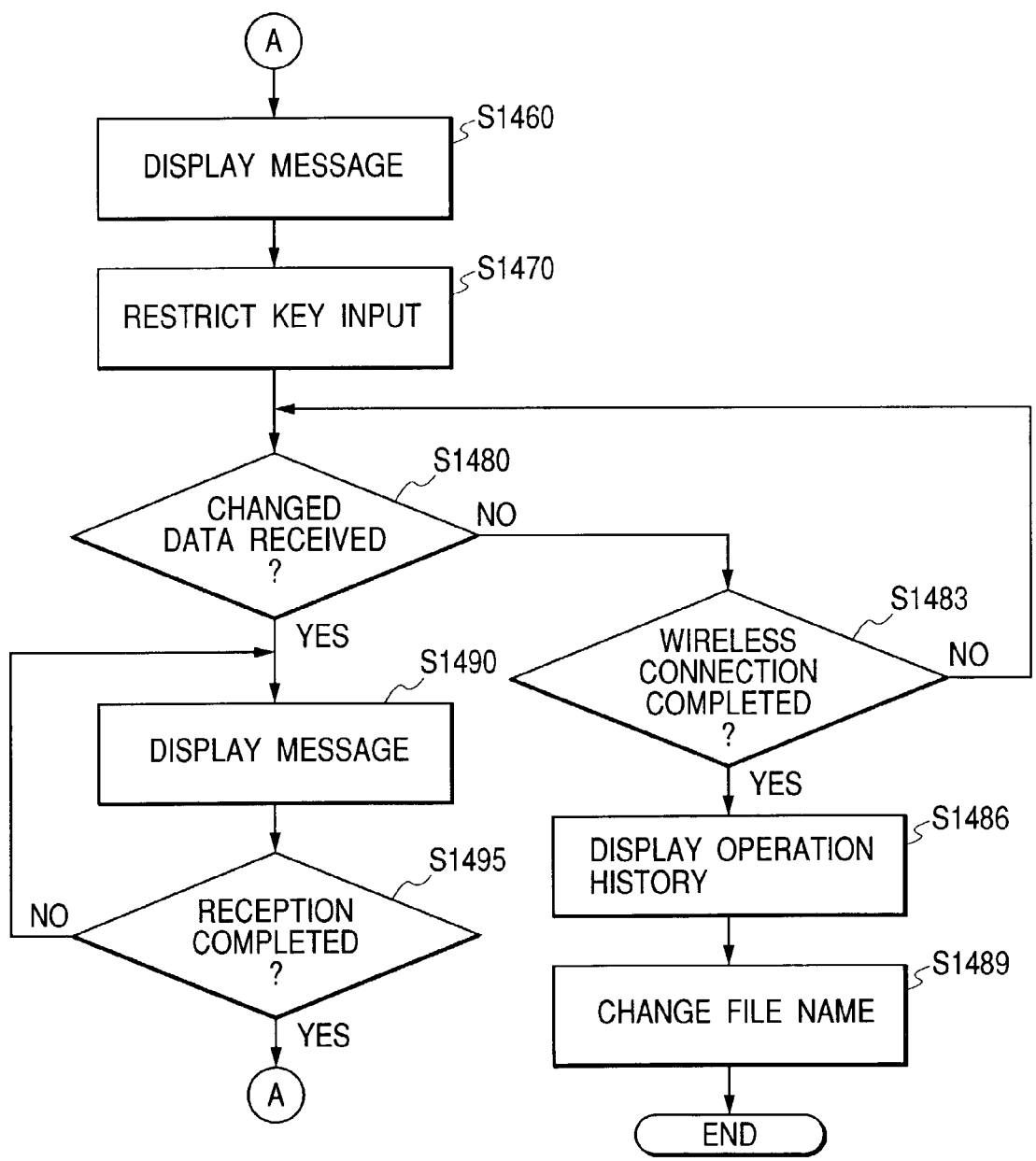
FIG. 15 is a flowchart for the imaging apparatus in the second embodiment.
Figure 16:
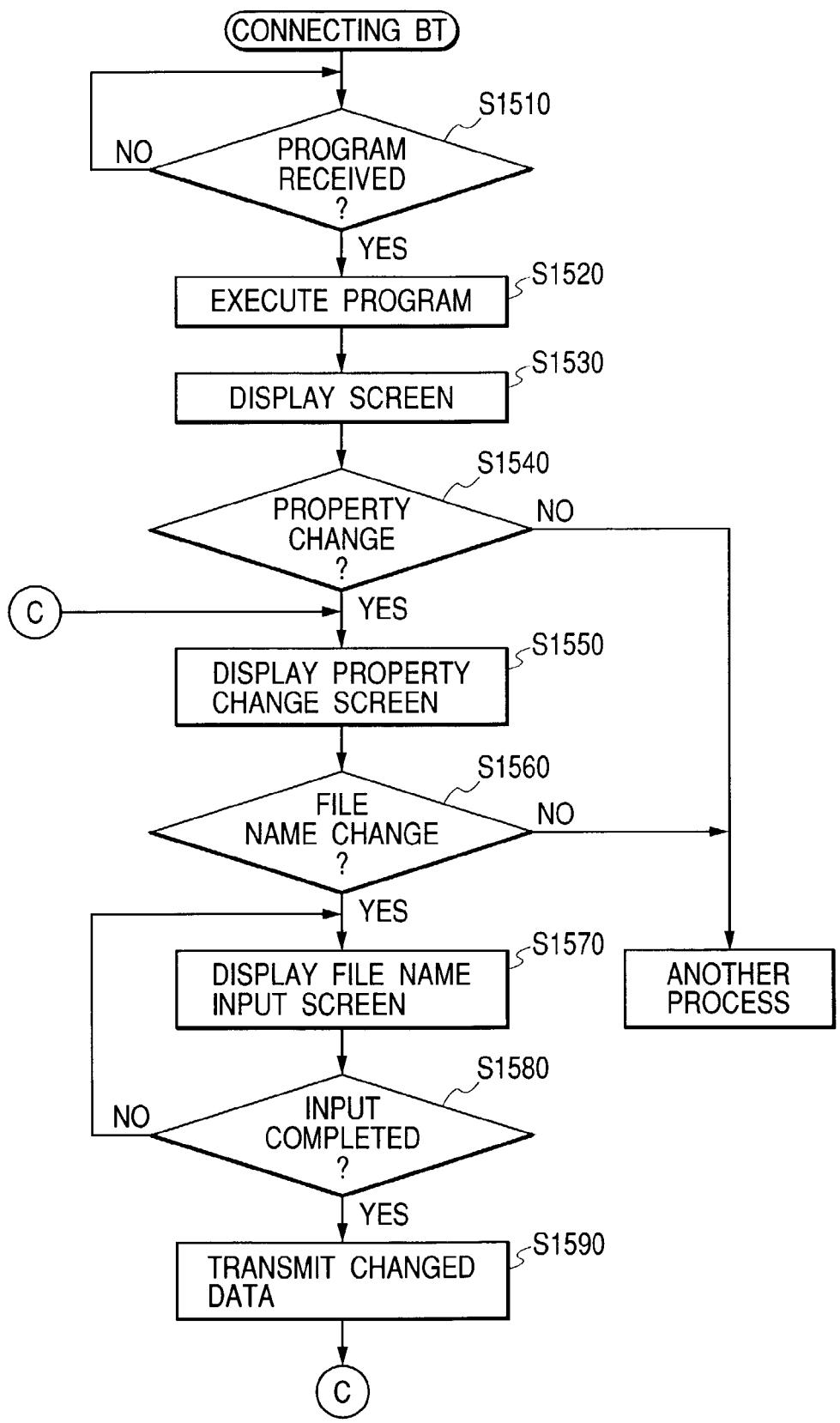
FIG. 16 is a flowchart for the cellular phone in the second embodiment.

FIGS. 14 and 15 are flowcharts for the control unit 607 of the imaging apparatus 701. FIGS. 14 and 15 show a part of programs stored on the memory 607M. FIG. 16 shows a part of the program stored on the memory 67M. The control units 607, 67 may be defined as computers operating by reading these programs from the memories 607M, 67M. The memories 607M, 67M are storage mediums stored with these programs in a way that enables the control units 607, 67 to read these programs.

The programs shown by the flowcharts in FIGS. 14 and 15 may be stored on the memory 607M from outside via the wireless communication unit 601. Further, in a mode wherein these programs are stored a memory card and the control unit 607 reads these programs by use of an unillustrated memory reader and stores the programs on the memory 607M, this memory card corresponds to a storage medium stored with the programs in a way of its being readable by the control unit 607. Given hereinafter is an explanation of operations of the imaging apparatus 701 and the cellular phone 702 under the control of the control units 607, 67 operating based on the programs shown in FIGS. 14, 15 and 16.

The imaging apparatus 701 is in the process of operating in a reproducing process and obtains terminal information of the connected terminal (which is the cellular phone 702 in this case) on the basis of the Bluetooth connection, and a screen 801 shows a state of displaying the obtained information (step S1410). As a result of obtaining the terminal information, the cellular phone 702 implements Java execution environment, and, if the external program can be uploaded into the cellular phone 702 (step S1420), as on the screen 801, there are displayed a (YES) button and a (NO) button for determining whether the program is uploaded or not (step S1430).

Herein, it is confirmed that the cellular phone 702 has implemented Java execution environment, and hence whether the corresponding program can be transmitted or not is selected by use of the key input unit 608. Note that whether the program can be transmitted or not is selected by manipulating the key input unit 68 of the cellular phone 702 according to another mode of the present invention.

If not transmitted, the text data can be inputted on the cellular phone in the same procedures as those described in the first embodiment.

If the transmission of the program is selected (step S1440), the program data for a file management are transmitted from the program data storing unit 609 to the cellular phone 702 through a Bluetooth communication means (step S1450).

After the transmission, on the cellular phone 702, the wireless communication unit 61 receives the program data for the file management (step S1510) and stores the same data on the program data storing unit 69, and the program for the file management is executed (step S1520), thereby displaying a file management utility screen as on a screen 812 (step S1530). Note that the screen 812 is a screen displayed when selecting (2: display list) and further selecting an image specified by a file name "0001". The control unit 67 of the cellular phone 702 stores the received file management program on the program data storing unit 69, then reads this file management program from the program data storing unit 69 and executes the same program.

Hereinafter, the image data management on the imaging apparatus 701 is controlled on the side of the cellular phone 702, and hence, on the imaging apparatus 701, a message as on a screen 802 is displayed on the display unit 605 (step S1460), and a key input from the key input unit 608 is restricted (step S1470).

The file management program downloaded into the cellular phone 702 enables the cellular phone 702 to display a list of the image data within the imaging apparatus 701 and to modify the additional information thereof. From a state on the screen 812, (change property) is selected by using an up-down key and a select key of the key input unit 68 of the cellular phone 702 (step S1540), whereby a menu display on the display unit 65 is changed from 812 to 813 (step S1550). Then, various items of additional information of the corresponding image data can be modified.

From the state on the screen 813, the modification of the file name is selected by using the up-down key and the select key of the cellular phone 702 (step S1560), the screen on the display unit 65 changes to an input screen for inputting the actually modified file name as shown on a screen 814 (step S1570). The screen 814 shows a state wherein the user inputs (scene part 1) by use of the ten keys of the cellular phone 702.

On the screen 814, (OK) is selected and the input comes to a completion (step S1580), the cellular phone 702 transmits the inputted modified file name from the wireless communication unit 61 (step S1590).

On the other hand, the wireless communication unit 601 of the imaging apparatus 701 receives this modified file name (step S1480). During a receipt of this modified file name, on the side of the imaging apparatus 701, a screen (message) confirming that the modified data are being transmitted is displayed as on a screen 804 (step S1490). Note that the restriction of the key input continues during the display of this screen 804. Upon finishing the receipt (step S1495), the display returns to a screen 805.

Further, after finishing the communication in step S1590, the display returns to a menu selection screen 815 on the cellular phone 702. From this state, the user selects an end of the communication by manipulating the up-down key and the select key of the cellular phone, thus executing a process of finishing the application and a process of finishing the Bluetooth connection. Then, the display returns to a normal screen 816 on the side of the cellular phone 702.

On the side of the imaging apparatus 701, as on the screen 806, a history of on-connection operations is displayed (step S1486) upon the end of the wireless connection (step S1483), and the file name in the data recording unit 604 is modified (step S1489). Thereafter, the display goes back to the normal screen. It is confirmed through these steps that the file name has been properly changed. This file name is one example in category of the additional data attached to the image data. In addition to the file name, other categories of information such as the photographer etc may also be changed.

Moreover, according to still another embodiment of the present invention, (5: next menu) is selected on a menu screen 812, and further, when (image transfer) is selected on the next menu screen (not shown), an additional information change screen 813 is displayed. When (OK) is selected after changing he additional information, the imaging apparatus 701 transmits the image data with the additional information changed to the cellular phone 702.

Furthermore, according to another mode of the present invention, (5: next menu) is selected on the menu selection screen 812, and, when the image transmission is selected on the next menu screen (unillustrated), the display changes to a file name input screen 814. Then, the imaging apparatus 701 receives the file name inputted on the cellular phone 702, and changes the file name of the image data stored on the data recording unit 604 to the file name inputted on the cellular phone 702. Thereafter, the image data given the file name inputted by the ten keys of the cellular phone 702 are read from the data recording unit 604, and transmitted to the destination via the wireless communication unit 601, the cellular phone 702 and the public wireless circuit. The destination is specified by the ten keys of the cellular phone 702 before indicating the transmission.

Moreover, according to one mode of the present invention, when transmitting the image data to the cellular phone 702, the file management program controls the sequence of pieces of additional information inputted on the cellular phone 702 in a way that rewrites a part or the whole of the additional information in accordance with preset additional information rewriting procedures. Take the screen 813 in FIG. 12 for example, firstly the file name, secondly the camera person's name, thirdly the photo date/time and fourthly the photo location are sequentially rewritten. All these items may be rewritten in this sequence, or only a part of the data may also be rewritten in a predetermined sequence.

Further, according to another mode of the present invention, in the case of transmitting the image data to the destination from the imaging apparatus 701 via the cellular phone 702 and the public line network by utilizing the public radio communication function of the cellular phone 702, the file management program rewrites the information of the destination as additional information attached to the image data to the data recording unit 604.

Moreover, according to still another mode of the present invention, the imaging apparatus 401 is connected to other device via the cellular phone 702 and the public wireless circuit by utilizing the public radio communication function of the cellular phone 702, the file management program is transmitted to the other device connected via the public wireless circuit, and the other device inputs the additional information such as the file name etc. Then, the inputted additional information is received by the imaging apparatus 701 via the public wireless circuit and the cellular phone 702 from the other device and recorded on the data recording unit 604.

Furthermore, according to a further mode of the present invention, when transmitting the image data to a destination party connected through the public wireless circuit via the cellular phone 702, the file management program rewrites a part or the whole of the additional information as inputted by the destination party connected through the public wireless circuit in accordance with the preset additional information rewriting procedures.

Note that the imaging apparatus 701 and the cellular phone 702 are linked based on the Bluetooth connection, however, as a substitute for Bluetooth, the wireless communication unit 601 may be provided with the public wireless communication function and connected to the cellular phone through the public wireless circuit.

A function of transferring and receiving the data to and from the other device connected through the public line by utilizing the public connection function of the cellular phone 702, is incorporated into the program data to be uploaded to the cellular phone 702, whereby the data management function in the imaging apparatus 701 can be also actualized in the device connected through the cellular phone 702.

Further, in a mode wherein each of the wireless communication units 101, 601 has the function of communicating with the base station for the public wireless circuit and the imaging apparatuses 401, 701 perform the communications with the base station for the public wireless circuit via the network, the wireless communication units 101, 601 transfer and receive the additional information or the program for rewriting the additional information to and from the other devices (e.g., the cellular phones 402, 702) wirelessly connected to the imaging apparatuses 401, 701, and the file names of the image data saved on the data recording units 104, 604 are rewritten corresponding to the data inputted on the other devices (e.g., the cellular phones 402, 702) connected via the public wireless circuit to the imaging apparatuses 401, 701.

Note that a part of the additional information and the all the items can be also automatically rewritten by presetting the additional information rewriting procedures when transmitting the image data to the other devices from the wireless communication units 101, 601 in the first and second embodiments discussed above.

Moreover, in the first and second embodiments discussed above, the additional information rewriting procedures are preset when transmitting the image data to the destination party connected through the public circuit by utilizing the public-connection-based communication functions of the cellular phones 402, 702 connected via the wireless communication units 101, 601, thereby making it possible to automatically rewrite a part of the additional information and all the items corresponding to the connected devices on the public circuit in accordance with these preset procedures.

The discussion of the present invention has been focused on the preferred embodiments so far, however, the present invention is not limited to the embodiments described above and may be modified in many forms within the range of claims which follow.

What is claimed is:

1. A method of writing location data related to image data in an imaging apparatus, comprising the steps of:
   requesting a wirelessly connected device to perform a display for inputting a character string corresponding to each of a plurality of attributes of the image data, wherein the plurality of attributes includes location data;
   receiving character data based on the character string inputted to the wirelessly connected device in accordance with a request in said requesting step; and
   writing the location data related to the image data in accordance with the character data received from the wirelessly connected device.

2. A method according to claim 1, wherein program code for inputting the character string is transmitted to the wirelessly connected device in said requesting step.

3. A method according to claim 1, wherein the location data related to the image data transmitted to the wirelessly connected device is written corresponding to the character string inputted to the wirelessly connected device in said writing step.

4. An imaging apparatus comprising:
   photographing means for photographing an image;
   storing means for storing image data of the photographed image in a memory;
   wireless request means for requesting a wirelessly connected device to perform a display for inputting a character string corresponding to each of a plurality of attributes of the image data, wherein the plurality of attributes includes location data;
   wireless data receiving means for receiving character data based on the character string inputted to the wirelessly connected device in accordance with a request by said wireless request means; and
   writing means for writing location data related to the image data stored in said memory in accordance with the character data received from said wirelessly connected device.

5. An imaging apparatus according to claim 4, wherein said wireless request means transmits a program for inputting the character string to the wirelessly connected device.

6. An imaging apparatus according to claim 4, wherein said writing means writes the location data relates to the image data transmitted to the wirelessly connected device, corresponding to the character string inputted to the wirelessly connected device.

* * * * *